United States Patent
Young et al.

(10) Patent No.: US 8,968,644 B2
(45) Date of Patent: Mar. 3, 2015

(54) NDNI5 ALLOYS FOR HYDROGEN STORAGE AND NI-MH BATTERIES

(75) Inventors: Kwo Young, Troy, MI (US); Michael A. Fetcenko, Rochester, MI (US); Baoquan Huang, Troy, MI (US); Ben Chao, Troy, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 278 days.

(21) Appl. No.: 12/928,109

(22) Filed: Dec. 2, 2010

(65) Prior Publication Data

US 2012/0141319 A1    Jun. 7, 2012

(51) Int. Cl.
| | | |
|---|---|---|
| *C22C 19/03* | (2006.01) | |
| *H01M 10/34* | (2006.01) | |
| *H01M 4/24* | (2006.01) | |
| *H01M 4/38* | (2006.01) | |

(52) U.S. Cl.
CPC .................. *C22C 19/03* (2013.01); *H01M 4/242* (2013.01); *H01M 4/383* (2013.01); *H01M 10/345* (2013.01)
USPC ........................................................ 420/455

(58) Field of Classification Search
CPC ..... C22C 19/03; H01M 4/242; H01M 10/345
USPC ........................................................ 420/455
See application file for complete search history.

(56) References Cited

U.S. PATENT DOCUMENTS 6,261,517 B1 *   7/2001   Kaneko et al. ................ 420/455

OTHER PUBLICATIONS

Chartouni et al., "The influence of cobalt on the electrochemical cycling stability of LaNi5-based hydride forming alloys", Mar. 21, 1996, Journal of Alloys and Compounds, pp. 160-166.*

* cited by examiner

*Primary Examiner* — Jessee Roe
(74) *Attorney, Agent, or Firm* — Gifford, Krass, Sprinkle, Anderson & Citkowski, P.C.

(57) ABSTRACT

A hydrogen storage alloy having the atomic formula AB4.75-5.25. Where A may comprise at least 85 atomic percent Nd and less than 15 atomic percent other rare earth elements and Mg and B may comprise Ni, Co, and at least one element selected from the group consisting of Mn and Al. The atomic percentages of Mn and Al may be governed by the following formulas where Mn and Al are in atomic percent: 1) Mn+1.5 Al≥6 atomic percent; and 2) Mn+Al≤12 atomic percent. The total percent of Mn and Al may provide the alloy with a 20° C. plateau pressure of between 4 and 25 psi, preferably between 6 and 20 psi. The hydrogen storage alloy allows a nickel metal hydride battery into which it is incorporated to maintain a voltage of at least 1.2 V at a depth of discharge of 90%.

4 Claims, 7 Drawing Sheets

NDNI5 ALLOYS FOR HYDROGEN STORAGE AND NI-MH BATTERIES

FIELD OF THE INVENTION

The present invention relates to hydrogen storage alloys, more particularly to $AB_5$ type hydrogen storage alloys, particularly for electrochemical use. Most specifically the present invention relates to substituted $NdNi_5$ electrochemical hydrogen storage alloys useful as the anode active material in Ni-MH batteries.

BACKGROUND OF THE INVENTION $LaNi_5$ alloys have been extensively studied for use in hydrogen storage and Ni—MH batteries. This is because of their ability to absorb and desorb large quantities of hydrogen (up to 6.7 hydrogen atoms per formula unit). Further, these alloys have moderate equilibrium plateau pressures at room temperature. However, the reversible storage capacity of pure $LaNi_5$ degrades unacceptably during thermal cycling. To overcome this problem substitutions for both La and Ni have been employed. Even with these substitutions, there exists another problem, particularly with respect to the electrochemical performance of the pure and substituted $LaNi_5$ alloys.

The problem relates to the discharge of Ni-MH batteries using the $LaNi_5$ type alloys. The problem is that as the battery is discharged, the voltage of the cell falls off long before the charge of the cell is depleted. This voltage drop is undesirable and can cause issues with devices employing the battery. It is preferable for the voltage of the cell to remain at the proper level for as much of the discharge cycle as possible. This effect can be correlated to the shape of the PCT curve for the hydrogen storage alloy. The typical PCT curve includes three "regions". The first is an initial high slope region where a small increase in the stored hydrogen increases the equilibrium pressure rather quickly. The second region is known as the plateau pressure region. In the plateau pressure region, the concentration of stored hydrogen can increase significantly with only a small or moderate increase in equilibrium pressure. The third region is another high slope region where once again small increases in concentration result in rapid increases in the equilibrium pressure.

The discharge voltage problem discussed above is related to the slope of the first region on the PCT curve. The steeper the initial slope of the PCT curve, the longer the cell will hold its working voltage during the discharge cycle. Conversely, the shallower the slope of the first region, the earlier in the discharge cycle the voltage begins to drop. Unfortunately, the $LaNi_5$ type alloys have relatively shallow slopes in the first region of the PCT curve.

$NdNi_5$ alloys are known to have storage capacity similar to that of $LaNi_5$ alloys. Further, the inventors note that the slope of the first region of the PCT curve is very steep for the $NdNi_5$ alloys, thus affording Ni-MH batteries made with these alloys with the ability to hold their cell voltage much longer into the discharge cycle than their $LaNi_5$ alloy counterparts.

Unfortunately, $NdNi_5$ alloys suffer from equilibrium plateau pressures at least an order of magnitude higher than those of the $LaNi_5$ alloys. This extremely high plateau pressure is unacceptable for use in Ni-MH batteries. This very high plateau pressure causes the battery to require a containment vessel that can handle such high pressures, and ultimately causes the cell to have a low storage capacity (because only a fraction of the total capacity is available at reasonable containment pressures.

Thus, there is a need in the art for a $NdNi_5$ type alloy which has both the steep slope of the first region of the PCT (for good discharge voltage characteristics) and a reasonable plateau pressure (for reasonable room temperature storage capacity).

SUMMARY OF THE INVENTION

One aspect of the present invention is a hydrogen storage alloy having the atomic formula $AB_{4.75-5.25}$. Where A may comprise at least 85 atomic percent Nd and less than 15 atomic percent other rare earth elements and Mg and B may comprise Ni, Co, and at least one element selected from the group consisting of Mn and Al. The total atomic percentage of Ni, Mn and Al may be between 71 and 77 atomic percent. The atomic percentage of Co may be between 5 and 13 atomic percent. The atomic percentages of Mn and Al may each be 0 to 12 atomic percent.

The atomic percentages of Mn and Al may be governed by the following formulas where Mn and Al are in atomic percent: 1) Mn+1.5 Al≥6 atomic percent; and 2) Mn+Al≥12 atomic percent. The total percent of Mn and Al may provide the alloy with a 20° C. plateau pressure of between 4 and 25 psi, preferably between 6 and 20 psi. Within the atomic formula, A may more preferably comprises at least 90 atomic percent Nd and may even more preferably comprises at least 95 atomic percent Nd.

Another aspect of the present invention is an $NdNi_x$ alloy, where X may be between 4.75 and 5.25 inclusive; and Ni may be partially substituted with Co, and at least one element selected from the group consisting of Mn and Al. The total atomic percentage of Ni, Mn and Al may be between 71 and 77 atomic percent. The atomic percentage of Co may be between 5 and 13 atomic percent. The atomic percentages of Mn and Al may each be 0 to 12 atomic percent.

The atomic percentages of Mn and Al may be governed by the following formulas where Mn and Al are in atomic percent: 1) Mn+1.5 Al≥6 atomic percent; and 2) Mn+Al≤12 atomic percent. The total percent of Mn and Al may provide the alloy with a 20° C. plateau pressure of between 4 and 25 psi, preferably between 6 and 20 psi.

The inventive Nd-based $AB_5$ hydrogen storage alloy provides the nickel metal hydride battery with a voltage of at least 1.2 V at a depth of discharge of 90%, at least 1.18 V at a depth of discharge of 94% and at least 1.16 V at a depth of discharge of 96%.

DETAILED DESCRIPTION OF THE INVENTION

The present invention is a hydrogen storage alloy having the atomic formula $AB_{4.75-5.25}$. Where A may comprise at least 85 atomic percent Nd and less than 15 atomic percent other rare earth elements and Mg and B may comprise Ni, Co, and at least one element selected from the group consisting of Mn and Al. The atomic percentages of Mn and Al may be governed by the following formulas where Mn and Al are in atomic percent: 1) Mn+1.5 Al≥6 atomic percent; and 2) Mn+Al≤12 atomic percent. The total percent of Mn and Al may provide the alloy with a 20° C. plateau pressure of between 4 and 25 psi, preferably between 6 and 20 psi. The total atomic percentage of Ni, Mn and Al may be between 71 and 77 atomic percent. The atomic percentage of Co may be between 5 and 13 atomic percent. The atomic percentages of Mn and Al may each be 0 to 12 atomic percent.

Sample Preparation—Alloy Synthesis

All neodymium based $AB_5$ type metal hydride alloys were prepared by arc melting. The arc melting system is equipped with a vacuum pump to evacuate the chamber pressure below 50 microns. Weighed amounts of starting raw materials (according to the designed composition) were placed on the sample pan. Inert argon gas was back filled into the system at 2 psig during the melt process. Typical sample weight was about 20 grams per melt. An ingot was formed after the initial melt from the raw materials. To eliminate or significantly reduce the gas impurity contamination to the ingot, a piece of getter material (Zr or Y) was placed next to the raw materials during the melt. In order to ensure uniformity, the ingot was flipped over and re-melted at least four times. Every alloy ingot was routinely characterized by pressure-composition-temperature (PCT) testing measured at 20° C.

Pressure-Composition-Temperature (PCT) Measurements:

The PCT system consists of a hydrogen gas supply, a hydrogen gas reservoir of fixed volume, a sample chamber of fixed volume, a pressure gage, and an evacuation pump. Sample of known mass were placed in the chamber, charged with hydrogen at a pressure of about 300 psi, and heated in an oven at 250° C. for 30 min, and then cooled to room temperature to achieve activation of the material. Sample activation was followed by an evacuation of the entire system. Once the evacuation was complete, the sample chamber was immersed in a liquid bath at a pre-determined constant temperature. Research grade hydrogen gas was introduced to the hydrogen reservoir at a certain level. Once the reservoir gas pressure stabilized, hydrogen gas was introduced into the chamber to react with the sample until a static (quasi-equilibrium) pressure was reached. The hydrogen pressure was then gradually increased or decreased at fixed intervals and allowed to equilibrate. From the temperature, pressure change and volumes, the amount of hydrogen that was absorbed by the sample can be precisely calculated.

Figure 1:
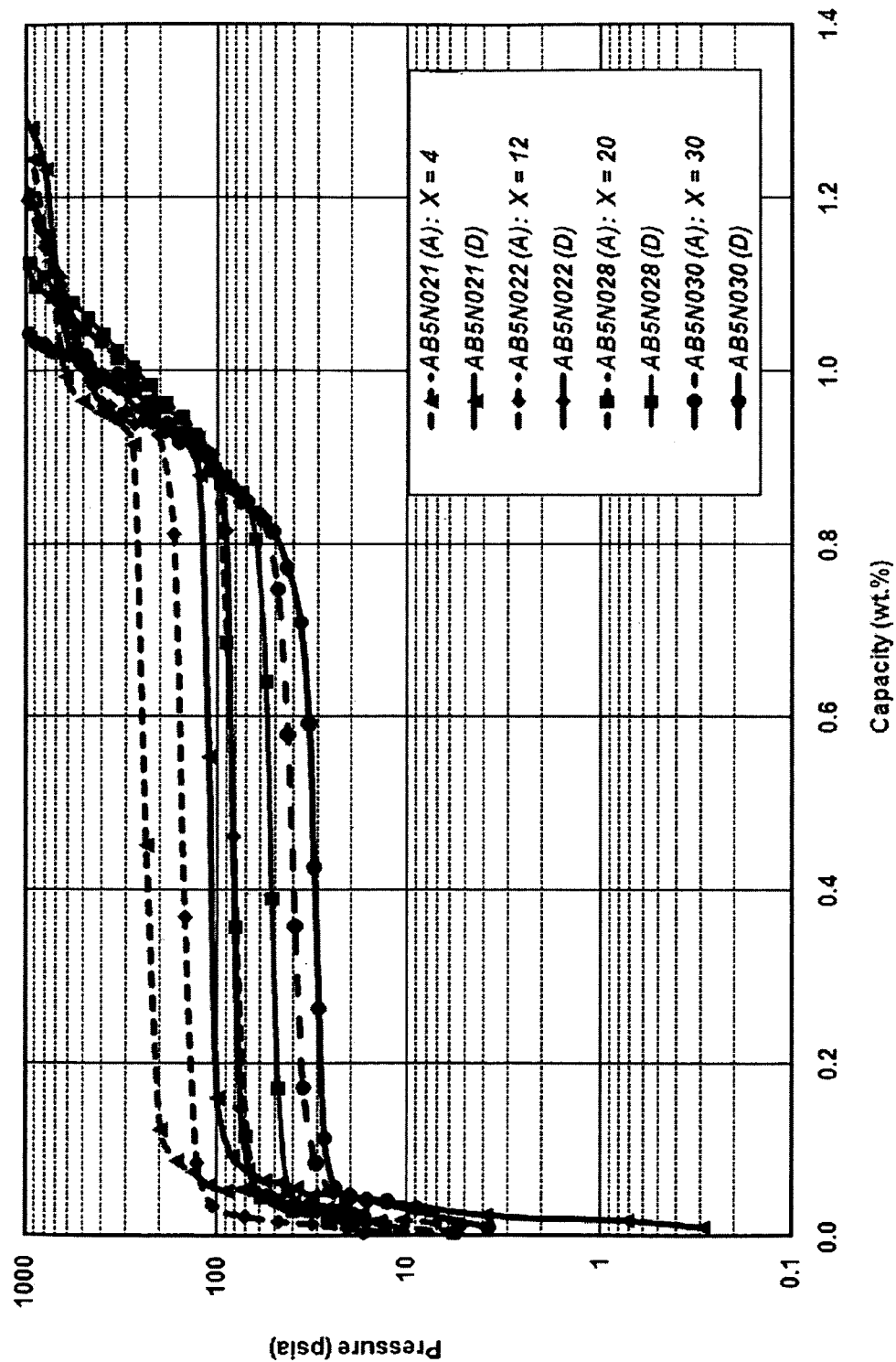
FIG. 1 is a composite of PCT absorption/desorption curves of $Nd_{17}(CO_xNi_{83-X})$ alloys.

Control Samples—$Nd_{17}(Co_xNi_{83-x})$ Alloys:

In the literature, the $Nd_{17}Ni_{83}$ alloy ($NdNi_5$) has a reported absorption/desorption plateau pressure higher than 20 bars at room temperature. As noted above, this plateau pressure is too high to be used as an anode for battery application. Partial substitution of Co for Ni has been demonstrated to reduce the plateau in other AB5 alloy families. Table 1 summarizes the PCT results characterized from a series of $Nd_{17}(Co_xNi_{83-x})$ alloys having Co substitutions ranging from 4 to 30 at.percent. It is found that the increase in Co substitution in the alloys correlates to the progressive decrease in alloy plateau pressures along with reduction of the total absorption capacity. FIG. 1 displays a group of PCT absorption/desorption curves for the alloys having Co substitutions of 4, 12, 20 and 30 at.percent. The desorption plateau pressure of the alloy with 30 at.percent Co substitution is about 33 psia that is still too high for battery use. Further increase in Co substitution would prohibitively increase the alloy cost. Thus, Co substitution alone will not provide the required reduction in plateau pressure for the NdNi5 alloy system.

TABLE 1

Composition, $H_2$ capacity and desorption plateau pressure $Nd(Co,Ni)_5$ Alloys

| | (at. percent) | | | $H_2$ (wt. percent) | P (des. at 0.6 wt. percent) |
|---|---|---|---|---|---|
| Alloy ID | Nd | Co | Ni | (Abs. @ 1000 psia) | at 20° C. (psia) |
| AB5N008 | 16.7 | | 83.3 | 1.26 | 68 (0° C.) - main |
| AB5N021 | 17 | 4 | 79 | 1.28 | 110 (main) |
| AB5N015 | 17 | 8 | 75 | 1.27 | 100 (main) |
| AB5N022 | 17 | 12 | 71 | 1.20 | 84 (main) |
| AB5N027 | 17 | 16 | 67 | 1.11 | 70 |
| AB5N028 | 17 | 20 | 63 | 1.13 | 54 |
| AB5N029 | 17 | 24 | 59 | 1.08 | 45 |
| AB5N030 | 17 | 30 | 53 | 1.04 | 33 |

INVENTIVE EXAMPLE 1

Figure 2:
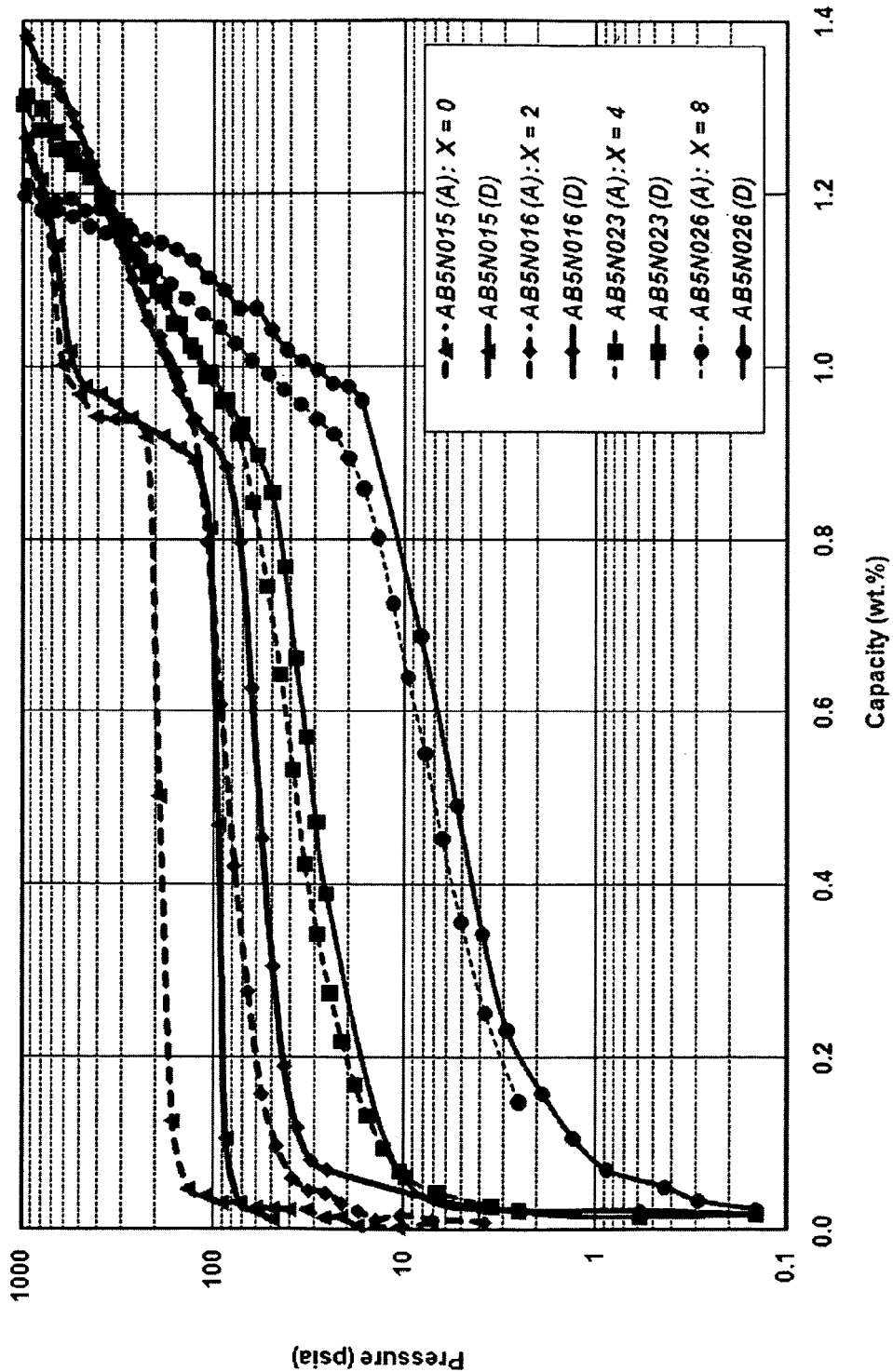
FIG. 2 is a composite of PCT absorption/desorption curves of $Nd_{17}CO_5Ni_{75-X}Al_X$ alloys.

FIG. 2 shows the effect of aluminum substitution for nickel in the $Nd(Co,Ni)_5$ alloys in reducing the absorption/desorption plateau pressures. The desorption plateau pressure is decreased from 100 psia for the base alloy to about 7 psia for the alloy with 8 atomic percent aluminum substitution; $Nd_{17}CO_8Ni_{67}Al_8$. The corresponding desorption plateau pressures of other inventive alloys are listed in Table 2. The hysteresis is reported to be linked with the stress generated from hydriding/dehydriding phase change.

TABLE 2

Composition, $H_2$ capacity and desorp. plateau pressure of $Nd_{17}Co_8Ni_{75-x}Al_x$ Alloys

| | (at. percent) | | | | $H_2$ (wt. percent) | P (des. at 0.6 wt. percent) |
|---|---|---|---|---|---|---|
| Alloy ID | Nd | Co | Ni | Al | (Abs. @ 1000 psia) | at 20° C. (psia) |
| AB5N015 | 17 | 8 | 75 | | 1.27 | 100 (main) |
| AB5N016 | 17 | 8 | 73 | 2 | 1.38 | 61 |
| AB5N023 | 17 | 8 | 71 | 4 | 1.31 | 33 |
| AB5N026 | 17 | 8 | 67 | 8 | 1.21 | 6.8 |

EXAMPLE 2

Figure 3:
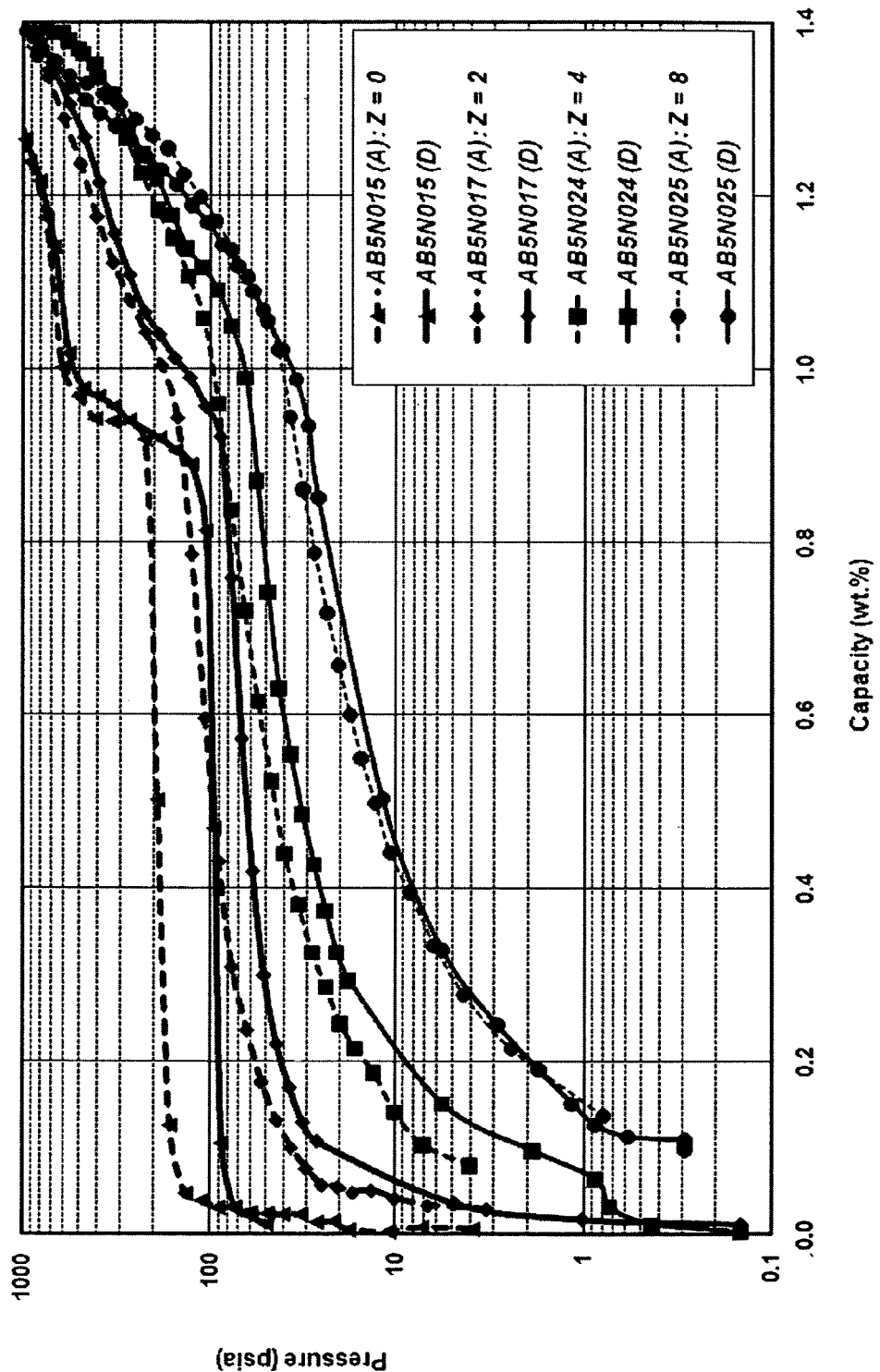
FIG. 3 is a composite of PCT absorption/desorption curves of $Nd_{17}Mn_ZCO_8Ni_{75-Z}$ alloys.

Manganese can have the same effect as aluminum in reducing the absorption/desorption plateau pressures when substituted for nickel in the $Nd(Co,Ni)_5$ alloys. FIG. 3 shows a composite graph of PCT curves of four $Nd_{17}Mn_zCO_8Ni_{75-z}$ alloys. A desorption plateau pressure of 15 psia is observed at 8 at.percent Mn substitution; $Nd_{17}Mn_8CO_8Ni_{67}$. Table 3 lists the corresponding desorption plateau pressures of other inventive alloys. Again, similar to aluminum substitution, manganese substitution also significantly reduces the absorption/desorption hysteresis.

TABLE 3

Composition, $H_2$ capacity and desorp. plateau pressure of $Nd_{17}Mn_ZCo_8Ni_{75-Z}$ Alloys

| Alloy ID | Nd | Mn | Co | Ni | H2 (wt. percent) (Abs. @ 1000 psia) | P (des. at 0.6 wt. percent) at 20° C. (psia) |
|---|---|---|---|---|---|---|
| AB5N015 | 17 | | 8 | 75 | 1.27 | 100 (main) |
| AB5N017 | 17 | 2 | 8 | 73 | 1.38 | 69 |
| AB5N024 | 17 | 4 | 8 | 71 | 1.41 | 40 |
| AB5N025 | 17 | 8 | 8 | 67 | 1.39 | 15 |

EXAMPLE 3

Figure 4:
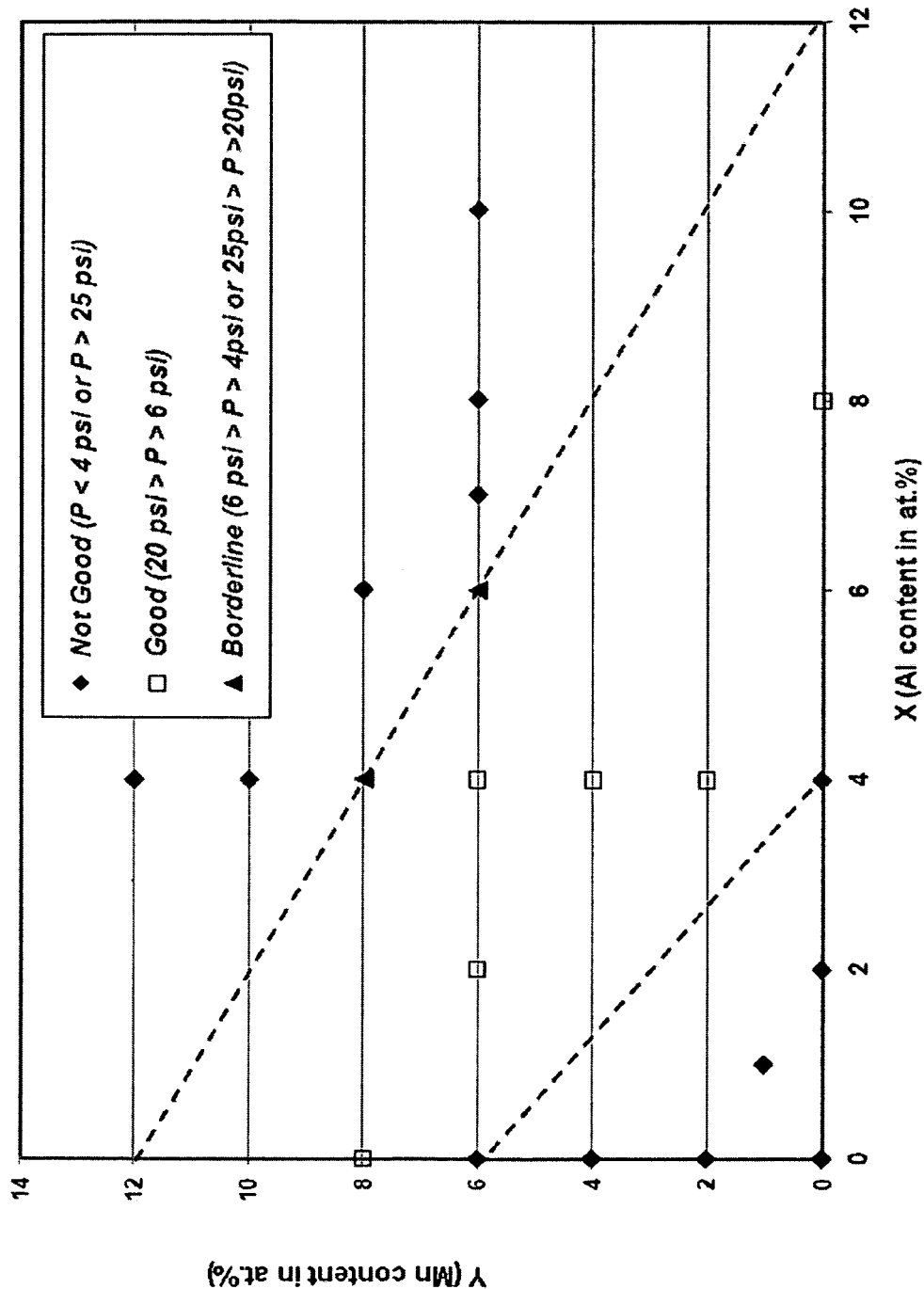
FIG. 4 is a graph of desorption plateau pressures of $Nd_{17}Mn_ZCO_8Ni_{75-X-Z}Al_X$ alloys.

FIG. 4 summarizes the desorption plateau pressures of the $Nd_{17}Mn_ZCO_8Ni_{75-X-Z}Al_X$ alloys at 20° C. The alloys are rated as good (□) when their desorption plateau pressures are in the range of between 6 to 20 psi. Alloys having desorption plateau pressures either less than 4 psi or higher than 25 psi are not useful for anodes of Ni-MH batteries (♦). Borderline alloys (▲) have a desorption plateau pressures are either between 4 to 6 psi or 20 to 25 psi. Thus, the total percent of Mn and Al in the alloy may provide a 20° C. plateau pressure of between 4 and 25 psi, preferably between 6 and 20 psi. FIG. 4 more specifically plots the alloy Mn concentrations versus Al concentrations and indicates whether the alloy compositions have good (□), bad (♦), or borderline (▲) plateau pressure at 20° C. From FIG. 4 it can be seen that alloy compositions with at least borderline (and above) are bounded by the following formulas with respect to Mn and Al concentrations, where Mn and Al are in atomic percent:
1) Mn+1.5 Al≥6 atomic percent; and
2) Mn+Al≤12 atomic percent.

Electrochemical Measurements:

Alloy ingots were mechanically crushed to <75 microns powder. The electrodes were fabricated by pressing alloy powder (~100 mg) into nickel screens without any binder or conductive powder. Electrochemical properties were measured by Arbin instruments with an open two-electrode half cell consisting of a working electrode (metal hydride electrode), and a sintered $Ni(OH)_2/NiOOH$ (used as both the counter and reference electrode). The electrolyte was a 30 percent KOH aqueous solution. In each charge/discharge cycle, the electrode was charged for 10 hours at 50 mA/g and discharged at 50 mA/g to a cut-off voltage of 0.9 V (cell voltage). This was followed by two pulls at 12 mA/g and 4 mA/g. The test results are summarized in Table 4. Both alloys achieved capacities close to 290 mAh/g at a rate of 50 mA/g. Further pulls at low discharge currents did not generate appreciable amount of capacity and therefore the high rate dischargeability of these two alloys are considered good.

TABLE 4

Electrochemical capacities of alloys $Nd_{17}Mn_4Co_8Ni_{67}A_{l4}$ and $Nd_{17}Mn_6Co_8Ni_{63}Al_6$

| Alloy | $1^{st}$ discharge (50 mA/g) | Pull at 12 mA/g | Pull at 4 mA/g | $2^{nd}$ discharge (50 mA/g) | Pull at 12 mA/g | Pull at 4 mA/g |
|---|---|---|---|---|---|---|
| $Nd_{17}Mn_4Co_8Ni_{67}Al_4$ | 288 | 1 | 1 | 276 | 1 | 1 |
| $Nd_{17}Mn_6Co_8Ni_{63}Al_6$ | 291 | 2 | 1 | 285 | 1 | 1 |

Figure 5:
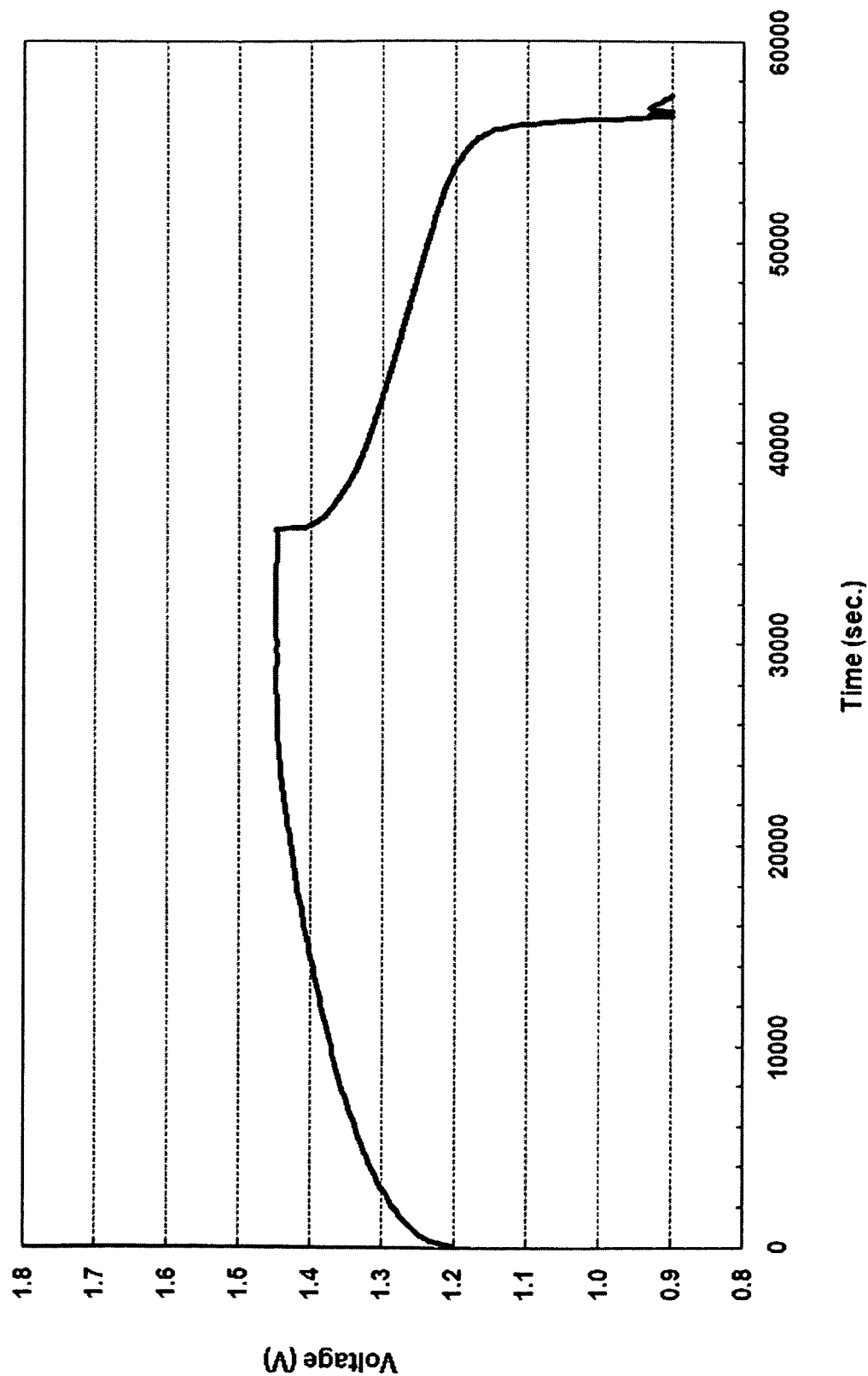
FIG. 5 is the electrochemical charge/discharge curves measured for a cell made with an $Nd_{17}Mn_4CO_8Ni_{67}Al_4$ alloy.
Figure 6:
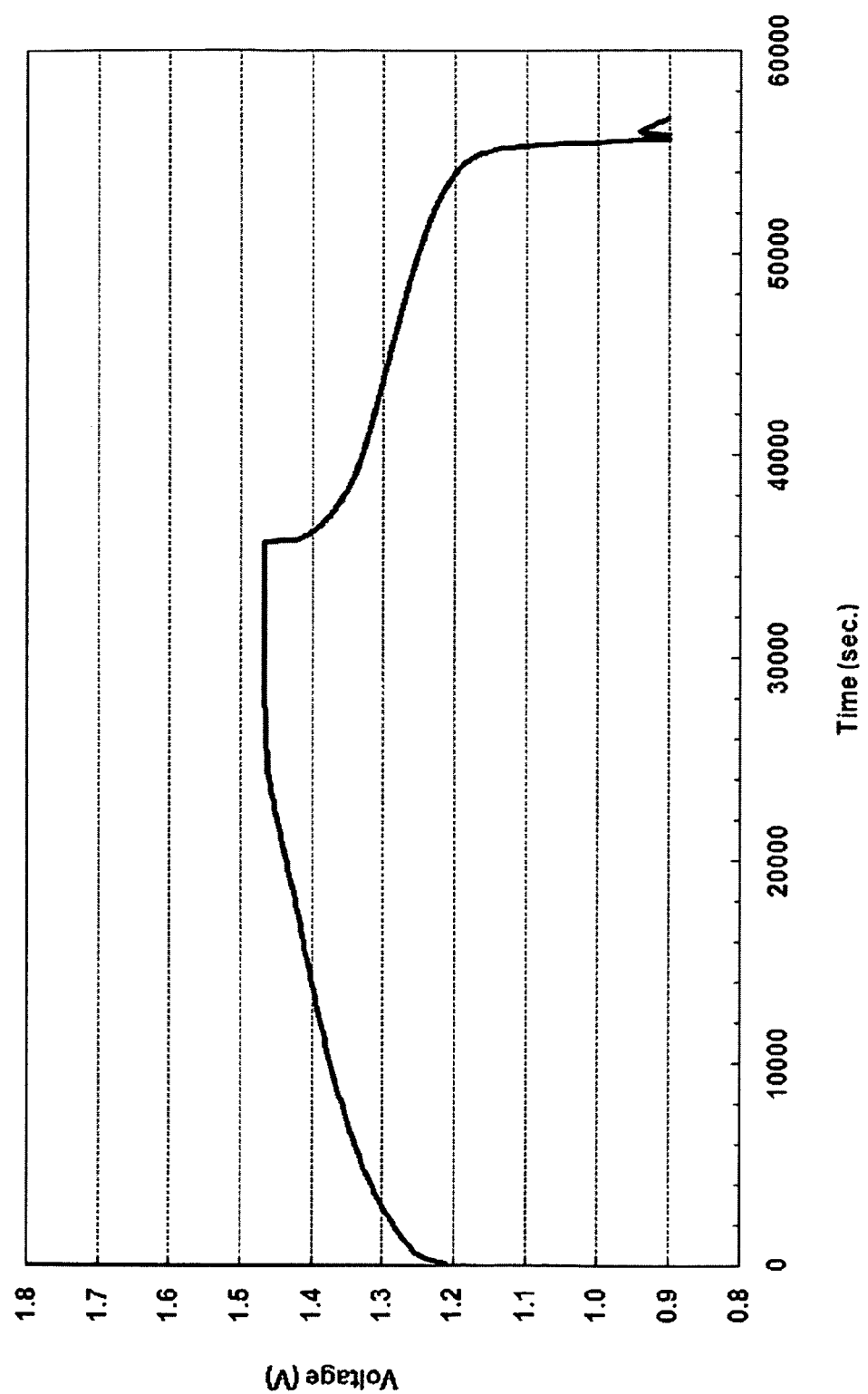
FIG. 6 is the electrochemical charge/discharge curves measured for a cell made with an $Nd_{17}Mn_6CO_8Ni_{63}Al_6$ alloy.

FIGS. 5 and 6 are two graph of voltage versus time for a charge/discharge cycle for electrodes made with alloy composition $Nd_{17}Mn_4CO_8Ni_{67}Al_4$ and $Nd_{17}Mn_6CO_8Ni_{63}Al_6$, respectively.

Figure 7:
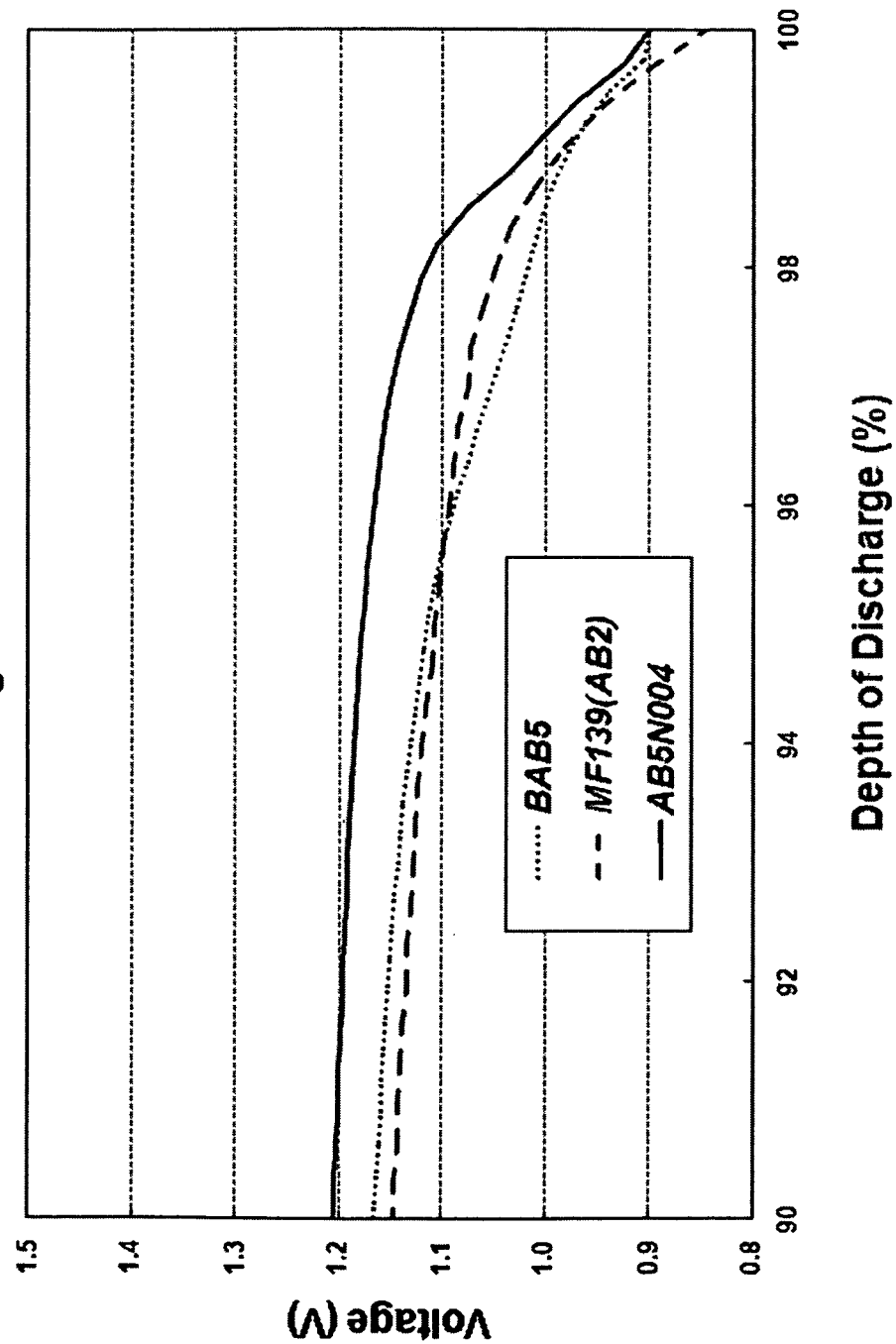
FIG. 7 is the electrochemical discharge curves at high depth of discharge of three batteries, one incorporating a Mischmetal AB5 alloy negative electrode material, a second including an AB2 alloy negative electrode material, and a third incorporating the inventive neodymium-based AB5 alloy negative electrode material.

FIG. 7 compares the discharge curves of three batteries, one incorporating a Mischmetal $AB_5$ alloy negative electrode material, a second including an $AB_2$ alloy negative electrode material, and a third incorporating the inventive neodymium-based $AB_5$ alloy negative electrode material. As can be seen from the discharge curves, the inventive alloys, provide the batteries with higher full stage at the discharge levels. Specifically, the neodymium-based alloy provides the nickel metal hydride battery with a voltage of at least 1.2 V at 90% depth of discharge. Further, the inventive alloy provides the battery with a voltage of at least 1.18 V at a 94% depth of discharge, and at least 1.16 V at a 96% depth of discharge. Table 5 compares the voltage of the Mischmetal-based $AB_5$, the $AB_2$, and the inventive neodymium-based $AB_5$ batteries at both 94% and 96% depth of discharge. It is clear that the neodymium-based hydrogen storage alloy provides nickel metal hydride batteries with significantly increased voltage at high depth of discharge.

TABLE 5

Voltage at High Depth of Discharge

| | BAB5 (Mm based $AB_5$) | MF139 ($AB_2$) | AB5N004 (Nd-$AB_5$) |
|---|---|---|---|
| Voltage at 94% DOD | 1.131 V | 1.119 V | 1.186 V |
| Voltage at 96% DOD | 1.088 V | 1.094 V | 1.167 V |

The foregoing is provided for purposes of explaining and disclosing preferred embodiments of the present invention. Modifications and adaptations to the described embodiments, particularly involving changes to the alloy composition and components thereof will be apparent to those skilled in the art. These changes and others may be made without departing from the scope or spirit of the invention in the following claims.

The invention claimed is:

1. A hydrogen storage alloy having the atomic formula $AB_{4.75-≤5.0}$: wherein A comprises at least 85 atomic percent Nd and less than 15 atomic percent of other rare earth elements and Mg; and wherein B comprises Ni, Co, and at least one element selected from the group consisting of Mn and Al.

2. The hydrogen storage alloy of claim 1, having the atomic formula $AB_{4.88}$.

3. The hydrogen storage alloy of claim 1, wherein the atomic percentage of Co is between 5.3 and 13 atomic percent of the entire alloy.

4. The hydrogen storage alloy of claim 1, said alloy further characterized that wherein when it is incorporated into a nickel-metal hydride battery, said nickel-metal hydride battery has a voltage of at least 1.2 V at a depth of discharge of 90%.

\* \* \* \* \*